TELEPHONE CLOCK

Filed June 3, 1957

INVENTORS
David Gruber
Warren D. Winkler
BY
Kane, Dalsimer and Kane
Attorneys

United States Patent Office 2,895,549

Patented July 21, 1959

2,895,549

TELEPHONE CLOCK

David Gruber, Rego Park, and Warren D. Winkler, Jamaica Estates, N.Y.; said Winkler assignor to said Gruber Application June 3, 1957, Serial No. 663,182

1 Claim. (Cl. 161—19)

This invention relates generally to clocks and more particularly to a clock designed for attachment to the movable dial portion of a telephone.

When a person is speaking or listening on a telephone, it is often desirable and sometimes a neecssity that the one so engaged have available to him a clock so that he can refer to it in order to determine the time at which a telephone call is made or received.

Also, it is useful for the user of a telephone to be able to time the length of his call since the charge made in connection with the use of a telephone is based upon the length of the conversation.

Since the telephone in many homes and in most offices is placed in a conspicuous location, the attachment of a clock to a telephone provides a way of maintaining a clock always in position to be seen.

Despite all the recognized advantages of having a telephone clock available, a satisfactory clock of this nature has never been produced prior to this invention. Heretofore, in the design of telephone clocks, complicated attachment means have been resorted to which have often required special tools in order to attach or detach the clock to the telephone. Also, the telephone clocks heretofore provided have often disfigured the appearance of a telephone and interfered with the use thereof. These telephone clocks had, in many instances, to be custom made for various types of phones and then could not be used with any other type. As used herein the term telephone clock designates the combination of the watch movement and the casing therefor which is designed to be secured to the telephone dial.

The invention herein disclosed has as its principal object the furnishing of a new telephone clock which is readily attachable to the dial of a telephone and does not require the use of tools for such attachment to be made.

Another object of this invention is to provide a telephone clock which will fit almost all types of telephones so that it is interchangeable and yet will not interfere with the use of the telephone.

A further object of this invention is to provide a telephone clock that is easily accessible for winding and setting of time.

And still another object of this invention is the provision of a telephone clock having a watch movement which can be removed and replaced simply and easily.

A telephone clock embodying this invention and the manner of using the same is described herein with reference to the drawings in which.

Figure 1:
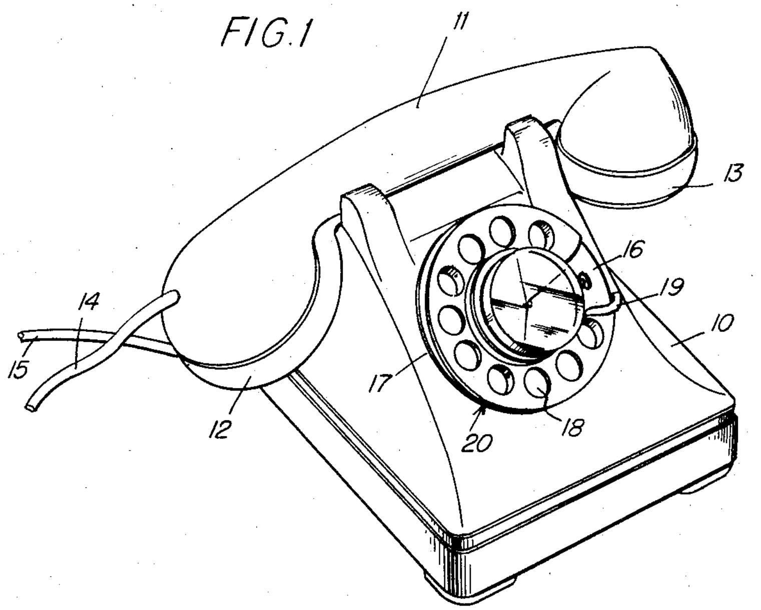
Fig. 1 is a perspective view of a telephone clock constructed in accordance with my invention attached to a telephone.

In Fig. 1 is shown an ordinary telephone with a base 10 and a common hand piece 11 having at one end thereof a portion 12 whereby the user may speak and at the other end a portion 13 out of which sound can emanate.

Wires 14 and 15 are provided in the ordinary manner. The telephone shown in Fig. 1 is of the type having a rotatable dial 16, with which a telephone number may be dialed, mounted upon base piece 10.

Dial face 17, which lies beneath rotatable dial 16, has printed thereon the various telephone number designations and these may be seen through finger holes in dial 16, such as finger hole 18. Stop member 19, which has one end thereof attached to base 10, overlaps rotatable dial 16 in the usual manner and a telephone clock which is designated generally by the numeral 20 is shown attached to rotatable dial 16.

Figure 2:
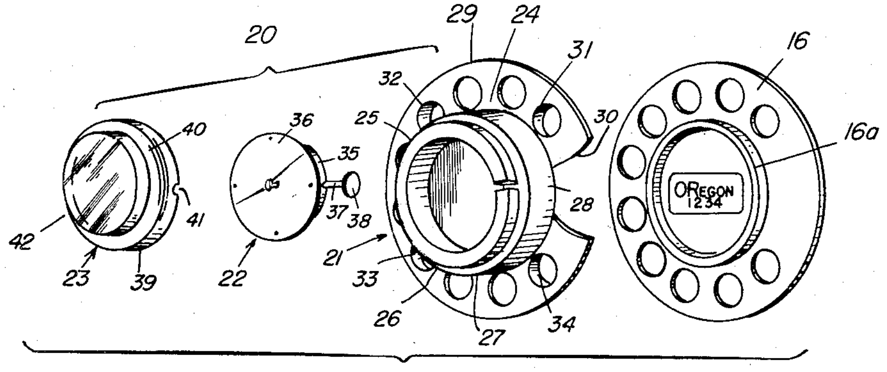
Fig. 2 is an exploded view of the telephone clock shown in Fig. 1.

Telephone clock 20 is shown in greater detail in the exploded view in Fig. 2. Upon reference to Fig. 2, it is noted that the telephone clock consists of seat member 21, watch movement 22 and cover member 23. Rotatable dial 16 is also shown in the exploded view in Fig. 2 so that the relationship of the telephone clock to the rotatable dial is easily seen.

Seat member 21 comprises a hollow cylindrical portion 24 with flat circular disc 25 covering one end thereof, to which ring 26 is attached. Ring 26, which is of uniform internal diameter, has a portion with a smaller outside diameter at the end thereof furthest from cylindrical portion 24 so that shoulder 27 is formed about its periphery.

Slot 28, which is formed in ring 26, extends from shoulder 27 through ring 26, where it is formed with the smaller diameter.

Member 24 is provided with flange 29, which has circular openings therein through which the numbers and letters on dial 17 of the telephone may be observed. These openings are placed in a circular manner and so positioned that each opening can coincide with circular openings 18 of rotatable dial 16 when the telephone clock is positioned upon rotatable dial 16. The diameter of each of the circular openings in flange 29 is slightly less than the diameter of a circular opening 18 of dial 16.

Cutaway portion 30 of flange 29 is provided so that the telephone clock can be attached to rotatable dial 16, as will be explained below, without interfering with stop member 19. Four identical hollow cylindrical members designated 31, 32, 33 and 34 extend from the underside of the flange and provide the means by which the telephone clock is attached to the rotatable dial of the telephone.

The manner of attaching the telephone clock to rotatable dial 16 will be explained below. However, for the present it should be noted that each of these cylindrical members has an inside diameter equal to the inside diameter of the circular openings in flange 29 and each cylindrical member has an outside diameter approximately equal to the inside diameter of a circular opening 18 in rotatable dial 16.

Watch movement 22 can be any suitable movement having a body 35 of outside diameter slightly less than the inside diameter of ring 26 and a face 36 so that body 35 will fit within ring 26 having its rear portion resting upon disc 25 and its stem 37 lying in slot 28. In this position handle 38 of the watch movement is readily accessible. Face 36 is of slightly greater outside diameter than the inside diameter of ring 26 so that the rear portion of this face will lie flush with a portion of ring 26.

Cover 23 comprises ring member 39, which has an inside diameter slightly greater than the outside diameter of ring 26 and a shoulder 40. Slot 41 is formed therein so that ring 39 can be positioned to encompass ring 26 with shoulder 40 resting upon the ring 26 and stem 37 can extend outwardly through slot 41.

Surface 40a of shoulder 40 is adjacent face 36 of movement 22 at the periphery thereof and aids in maintaining movement 22 in position.

Transparent watch crystal 42 is attached to ring 39 so that the face of movement 22 can be observed. Watch crystal 42 is preferably transparent plastic. However, it can be formed of any other transparent material which is commonly used for this purpose.

Figure 3:
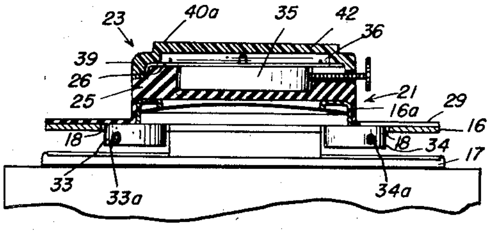
Fig. 3 is a partially sectional fragmentary view of the telephone clock shown in Fig. 1.

In Fig. 3, the telephone clock assembly is shown attached to rotatable dial 16 of a telephone. Cover 23 is set upon seat member 21 with watch movement 22 maintained in position. Ring 39 telescopes ring 26 and encompasses the portion of this ring of smaller outside diameter so that an edge of ring 39 rests upon shoulder 27 of ring 26 and a portion of shoulder 40*a* of ring 39 rests upon the edge of face 36 of the watch movement.

Body 35 of watch movement 22 lies within ring 26 so that its rear is substantially flush with disc 25 and stem 37 lies within slot 28.

Ring 24 encompasses raised portion 16*a* of rotatable dial 16 and hollow cylindrical members 33 and 34, which are shown, as well as hollow cylindrical members 31 and 32, which are not shown, are inserted in respective finger holes 18 in rotatable dial 16. Cylindrical members 31, 32, 33 and 34 being inserted in four finger holes 18 in the rotatable dial serve as a coupling means whereby flange 29 is coupled to the rotatable dial. Since flange 29 is coupled to the rotatable dial, the telephone clock is coupled to the rotatable dial.

The depth of flange 29 is such that the flange can pass beneath stop member 19 when rotatable dial 16 and the telephone clock, which is coupled thereto, are rotated.

Thus, upon assembly of the telephone clock and the coupling thereof to rotatable dial 16, a device is provided which will enable the operator of a telephone to determine time. This device will not interfere with the proper use of the telephone nor will it in any way take away from the appearance of the telephone. In fact, such device will enhance the beauty thereof.

It is to be noted that a greater or lesser number of cylindrical coupling members such as members 31, 32, 33 and 34 may be utilized and that the circular openings in flange 29 are positioned so that the number designations on dial face 17 of the telephone can be observed.

It is to be noted also that the value of the inside diameter of cylindrical member 24 is immaterial as long as the diameter is great enough so that ring 16*a* will not interfere with the coupling of flange 29 to the rotatable dial. In other words, the coupling is achieved solely through the means of hollow cylindrical members such as 31, 32, 33 and 34.

It is also to be noted that each of the cylindrical members is provided with a raised knob portion such as 33*a* and 34*a* so that the rotatable dial will lie between the respective knob and the underside of flange 29 when the telephone clock is coupled to the rotatable dial. This is an optional feature and provides for a snap-on coupling means so that a more secure coupling of the telephone clock to the rotatable dial can be obtained if it is desired.

With our telephone clock coupled to the rotatable dial of a telephone, a person using a telephone can determine time when he so desires and the telephone clock will not interfere with the use of the telephone since the number designations on the telephone can be seen and numbers can be dialed without obstruction.

Also, our telephone clock can be easily attached to the telephone and is interchangeable with almost all types of telephones.

Thus, among others, the several objects in the invention as specifically aforenoted are achieved. Obviously, numerous changes in construction and rearrangement of parts may be resorted to without departing from the spirit of the invention as defined by the claim.

We claim:

In a clock-supporting generally circular unitary attachment having portions for insertion into and engagement with the walls of the finger holes of the rotatable dial of a telephone, that improvement comprising a flat outer ring portion provided with downwardly projecting sleeves adapted to extend through and engage the walls of the finger holes in a telephone dial, an intermediate cylindrical housing portion concentric with and projecting upwardly from said outer ring portion, a top cylindrical housing portion concentric with and projecting above the intermediate cylindrical housing portion and forming a common inner wall therewith for housing a clock and having a smaller outer diameter forming a lip portion about said top cylindrical housing portion to engage an edge flange of a frictionally fitting cylindrical cover, a substantially circular bottom portion sealing the bottom of the intermediate cylindrical housing portion, said top cylindrical housing portion being formed with a substantially rectangular radial slot extending therethrough which is adapted to receive the winding and setting stem of a clock with the clock inside the housing and supported by said bottom portion and a substantially circular transparent cover provided with a downwardly projecting edge flange in frictionally gripping relation about said top cylindrical housing portion to seal the clock receiving housing.

References Cited in the file of this patent

UNITED STATES PATENTS

| | | |
|---|---|---|
| 1,906,656 | Stoeger | May 2, 1933 |
| 2,390,357 | Disken | Dec. 4, 1945 |
| 2,441,616 | Burke | May 19, 1948 |

FOREIGN PATENTS

| | | |
|---|---|---|
| 231,798 | Switzerland | July 17, 1944 |